United States Patent
Li et al.

(10) Patent No.: US 9,900,552 B2
(45) Date of Patent: Feb. 20, 2018

(54) CONFERENCE PROCESSING METHOD OF THIRD-PARTY APPLICATION AND COMMUNICATION DEVICE THEREOF

(71) Applicants: SHENZHEN GRANDSTREAM NETWORKS TECHNOLOGIES CO. LTD., Shenzhen, Guangdong (CN); GRANDSTREAM NETWORKS, INC., Brookline, MA (US)

(72) Inventors: Xiabin Li, Brookline, MA (US); Xiaofeng Xu, Brookline, MA (US); Bi Chen, Hangzhou (CN); Kepan Gao, Hangzhou (CN); Qisong Ding, Hangzhou (CN); Xi Chen, Hangzhou (CN); Li Chen, Hangzhou (CN); Ye Li, Hangzhou (CN)

(73) Assignees: SHENZHEN GRANDSTREAM NETWORKS TECHNOLOGIES CO., LTD, Shenzhen, Guangdong (CN); GRANDSTREAM NETWORKS, INC., Brookline, MA (US)

( * ) Notice: Subject to any disclaimer, the term of this patent is extended or adjusted under 35 U.S.C. 154(b) by 0 days.

(21) Appl. No.: 15/403,735

(22) Filed: Jan. 11, 2017

(65) Prior Publication Data
US 2017/0127022 A1     May 4, 2017

Related U.S. Application Data

(63) Continuation of application No. PCT/CN2015/089443, filed on Sep. 11, 2015.

(30) Foreign Application Priority Data

Jul. 14, 2014    (CN) .......................... 2014 1 0331364

(51) Int. Cl.
*H04N 7/15*     (2006.01)
*H04N 5/265*    (2006.01)

(52) U.S. Cl.
CPC ............... *H04N 7/15* (2013.01); *H04N 5/265* (2013.01)

(58) Field of Classification Search
None
See application file for complete search history.

(56) References Cited

U.S. PATENT DOCUMENTS 8,578,000 B2 * 11/2013 Van Wie ................. H04L 12/00
                                                                               709/220
2009/0088208 A1 * 4/2009 Xu ....................... H04M 1/7253
                                                                               455/557

(Continued)

FOREIGN PATENT DOCUMENTS

CN       101262526 A     9/2008
CN       101888522 A    11/2010

(Continued)

OTHER PUBLICATIONS

State Intellectual Property Office of the P.R. China (ISR/CN), "International Search Report for PCT/CN2015/089443", China, dated Dec. 15, 2015.

*Primary Examiner* — Creighton Smith
(74) *Attorney, Agent, or Firm* — Locke Lord LLP; Tim Tingkang Xia, Esq.

(57) ABSTRACT

The present invention provides a conference processing method of a third-party application, capable of connecting a call of the third-party application to a teleconference of the communication device. The method includes the following steps: receiving, by a virtual sound card/virtual graphic card, data from a third-party application; and if a teleconference exists in the system, further judging whether the third-party application is allowed to join in the teleconference; wherein if it is judged that the third-party application is allowed to join in the teleconference, a sound mixing module and a screen mixing module mix audio and video data transmitted (Continued)

over at least one local session line and audio and video data of the third-party application, and complete sound mixing playing and mixing and superposition display; and otherwise, the audio and video data of the third-party application is shielded.

12 Claims, 4 Drawing Sheets

(56) References Cited

U.S. PATENT DOCUMENTS

| | | | | |
|---|---|---|---|---|
| 2011/0138069 | A1* | 6/2011 | Momchilov | H04L 65/605 709/231 |
| 2011/0289518 | A1* | 11/2011 | Li | G06F 9/45537 719/324 |
| 2014/0267548 | A1* | 9/2014 | Yee | G06F 3/017 348/14.03 |
| 2015/0077509 | A1* | 3/2015 | Ben Natan | H04N 7/152 348/14.09 |
| 2015/0199169 | A1* | 7/2015 | Manley | G06F 3/162 710/106 |
| 2015/0373173 | A1* | 12/2015 | Taher | H04M 1/72519 370/328 |
| 2016/0342303 | A1* | 11/2016 | Van Wie | H04L 12/1822 |

FOREIGN PATENT DOCUMENTS

| | | |
|---|---|---|
| CN | 101902536 A | 12/2010 |
| CN | 103238317 A | 8/2013 |

* cited by examiner

CONFERENCE PROCESSING METHOD OF THIRD-PARTY APPLICATION AND COMMUNICATION DEVICE THEREOF

CROSS REFERENCE TO RELATED APPLICATIONS

The present application is a continuation of international application No. PCT/CN2015/089443, filed on Sep. 11, 2015, which claims priority to China Patent Application No. 201410331364.8, filed on Jul. 14, 2014, both of which are hereby incorporated by reference in their entireties.

TECHNICAL FIELD

The present invention pertains to the field of audio and video communications, and in particular, relates to an audio and video conference processing technology for mixing a third-party application based on an embedded communication device.

BACKGROUND

Figure 1:
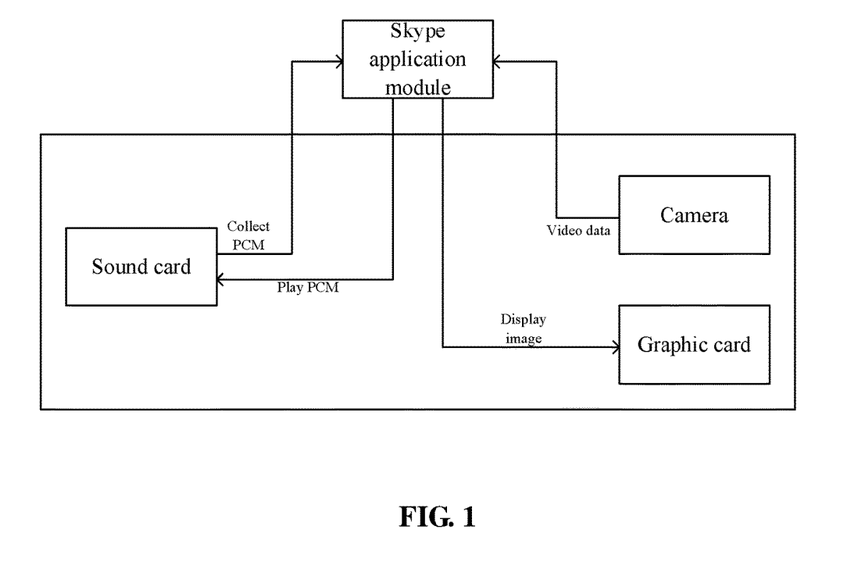
FIG. 1 is a schematic diagram of audio and video data processing in a Skype application in the prior art.

With the development and maturity of the audio and video processing technology, video conferences based on the audio and video processing technology are emerging. Conference calls become an important part of a terminal product combination of all enterprises. Therefore, multimedia conferences integrating the advanced IP application program and the high-definition audio and video technology may improve user experiences, and finally brings about positive effects on commercial exchanges and procedure management. VoIP phones at the current market provide audio and video conferences which generally integrate multiple paths of audio and video data received by a local phone. Data of other third-party application generally employs the protocol, data format and transmission mode thereof, and thus the data may be encrypted sometimes. Therefore, the data may not be directly used at the VoIP phone end. FIG. 1 is a schematic diagram of audio and video data processing in a Skype application in the prior art.

SUMMARY

The present invention is intended to provide a conference processing method of a third-party application, which may integrate audio and video data from the third-party application.

The present invention discloses a conference processing method of a third-party application, including the following steps: step a: receiving data from a third-party application, and acquiring voice data/image data of the third-party application; and step b: mixing, by an audio and video mixing module, audio and video data transmitted over at least one local session line, and the voice data/image data of the third-party application, to generate first mixed conference data for playing by a sound card/a graphic card.

Preferably, in step a, the data from the third-party application is received by a virtual sound card; and in step b, the audio and video mixing module includes a sound mixing module and/or a screen mixing module.

Preferably, upon step a, the method further includes the following steps: step a1: further judging whether the current system has a teleconference, proceeding with step a2 if the current system has a teleconference, and otherwise, processing the third-party application as a customary audio and video call; and step a2: further judging whether the third-party application joins in the teleconference, proceeding with step b if the third-party application joins in the teleconference, and otherwise, shielding audio and video data of the third-party application.

Preferably, the processing method may further include the following steps: (1) mixing, by the audio and video mixing module, audio/video data collected by the sound card/camera, and audio/video data transmitted over at least one local session line to generate second mixed conference data; and (2) transmitting, by the virtual sound card/virtual camera, the second mixed conference data to the third-party application upon audio/video collection for the second mixed conference data, such that the third-party application conducts transmission communication upon data and protocol processing for the second mixed conference data. The data and protocol processing herein includes coding and/or encryption.

Preferably, the third-party application, as customary audio and video call processing, involves the following two cases: (1) audio and video data output of an upper-layer application, i.e., unidirectional playing of the audio and video data, wherein the audio and video data is transmitted by the virtual sound card/virtual graphic card to the sound card/graphic card for output; and (2) input and output of the audio and video data of the upper-layer application, including a Skype call, wherein in this case, both playing of the audio and video data, and collection of the audio and video data are desired, the audio/video data sent by the virtual sound card/virtual graphic card is transmitted to the sound card/graphic card upon processing, and the data collected by the sound card/camera is uploaded to the virtual sound card/virtual camera upon processing, such that the upper-layer application acquires audio and video input data.

To achieve the inventive objective of the present invention, the present invention further provides a communication device for conference processing of a third-party application, capable of connecting a call of the third-party application to a teleconference of the communication device, wherein the communication device includes: a third-party application module, a virtual audio and video processing unit and an audio and video mixing module; wherein the virtual audio and video processing unit is configured to receive audio and video data input by the third-party application module, acquire audio data/image data of the third-party application, and transmit the acquired audio data/image data to the audio and video mixing module.

Preferably, the virtual audio and video processing unit is configured under an audio and video architecture of an operating system, and configured to provide an access interface; and the audio and video mixing module is configured to read decoded audio data/image data of the third-party application via the access interface. The operating system includes: Linux, Windows, Android and iOS.

Preferably, the communication device further includes: one or more than one local session line, configured to conduct communication of VoIP audio and video data; and the audio data/image data of the third-party application, and the VoIP audio and video data are mixed by the audio and video mixing module to generate first mixed conference data, such that the first mixed conference data is played by a sound card/graphic card.

Preferably, the communication device further includes: a teleconference control module, configured to manage and control the audio and video data of the third-party application; wherein when the communication device is not in a teleconference state, the audio and video data of the third-party application is used as a customary audio and video in the call of the third-party application; when the communication device is in the teleconference state and the third-party application is allowed to joint in the teleconference, the audio and video data of the third-party application is used as an audio and video to joint in the teleconference for mixing and superposition; and when the third-party application does not join in the teleconference, the audio and video data of the third-party application is shielded.

Preferably, the audio and video mixing module is configured to mix and superpose an audio/video input of the sound card/camera, and the VoIP audio/video data input via the session line to generate second mixed conference data; and the virtual card/virtual camera is configured to collect audio and video signals from the second mixed conference data and transmit the collected audio and video signals to the third-party application module, such that the third-party application module conducts transmission communication upon data and protocol processing for the second mixed conference data.

Preferably, the virtual audio and video processing unit includes a virtual sound card and/or a virtual graphic card; and the audio and video mixing module comprises a sound mixing module and/or a screen mixing module.

Preferably, the virtual graphic card is a virtual device configured in the operating system which provides decoded video data input by the third-party application module for the screen mixing module; and the graphic card is configured to display an image acquired via video superposition by the screen mixing module.

Preferably, the virtual sound card/virtual graphic card supports the following applications: (1) audio and video data output of an upper-layer application, i.e., unidirectional playing of the audio and video data, wherein the audio and video data is transmitted by the virtual sound card/virtual graphic card to the sound card/graphic card for output; and (2) input and output of the audio and video data of the upper-layer application, including a Skype call, wherein in this case, both playing of the audio and video data, and collection of the audio and video data are desired, the audio/video data sent by the virtual sound card/virtual graphic card is transmitted to the sound card/graphic card upon processing, and the data collected by the sound card/camera is uploaded to the virtual sound card/virtual camera upon processing, such that the upper-layer application acquires audio and video input data.

With the conference processing method of a third-party application and the communication device thereof according to the present invention, a call of the third-party application may join in a common teleconference. For example, audio and video data of the third-party application may be added to the teleconference via a VoIP phone. The audio and video data is sent to and processed by a virtual sound card and a virtual graphic card, the access functions of the teleconference with respect to audio and video data input over other non-session lines may be greatly enriched. In addition, controlling the virtual sound card/virtual graphic card/virtual camera to process the audio and video data of the third-party application reduces expenditures on use of the hardware, and thus lowers the cost.

DETAILED DESCRIPTION

To make the objectives, technical solutions, and advantages of the present invention clearer, the technical solutions of the present invention are thoroughly and clearly described in detail with reference to specific embodiments and attached drawings. It should be understood that the embodiments described here are only exemplary ones for illustrating the present invention, and are not intended to limit the present invention. Based on the embodiments of the present invention, all other embodiments derived by persons of ordinary skill in the art without any creative efforts shall fall within the protection scope of the present invention.

According to the present invention, a virtual sound card/virtual graphic card is employed to add the call of a third-party application to a teleconference as an ordinary call. Since data between the third-party applications generally employ a dedicated protocol, data format and transmission mode, the data may be encrypted sometimes, and thus a VoIP phone may not directly use the data. However, playing and collection of audios and videos are carried out using a sound card/graphic card driver, audio and video data interaction with the driver is PCM data, and the VoIP phone may directly use the data. Therefore, after a virtual sound card/graphic card is configured in the VoIP phone, the audio and video data of the third-party application may be re-adapted.

Figure 2:
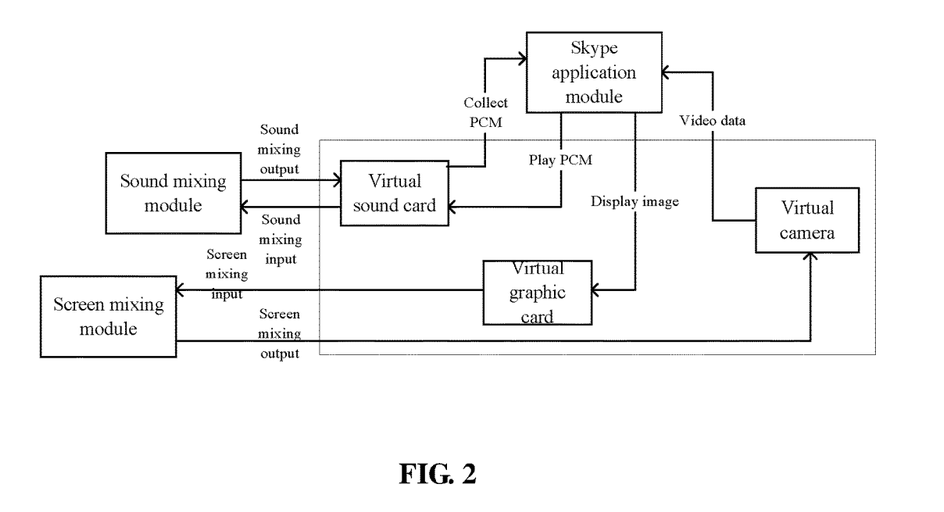
FIG. 2 is a diagram of functional modules according to Embodiment 1 of the present invention.

In Embodiment 1 of the present invention, the technical solution is described by using a third-party application Skype as an example. In practice, there is no need to consider what communication protocol the third-party application employs. FIG. 2 is a diagram of functional modules according to Embodiment 1 of the present invention. As illustrated in FIG. 2, a Skype application module, a virtual sound card, a virtual graphic card, a virtual camera, a sound mixing module and a screen mixing module are included.

The Skype application module decodes the PCM data of the input audio data thereof by using the virtual sound card. The sound mixing module carries out sound mixing for the decoded PCM data and other local audio data. The local audio data may be data that is transmitted by a sound card (not illustrated in the drawings) and collected by a local microphone, or audio data input over a local session line (not illustrated in the drawings). In addition, the virtual sound card may complete audio data collection with respect to the sound mixing module, and transmit the sound mixing data to another terminal device by using the Skype application module.

With respect to videos, the Skype application module displays an input video by using a virtual graphic card (not illustrated in the drawings) and transfers the displayed content to the screen mixing module. At the same time, screen mixed videos are collected in the screen mixing module by using a virtual camera. The virtual camera may also select to collect the video data of the camera (not illustrated in the drawings), and switchover is specifically implemented by a video processing unit (not illustrated in the drawings). In the above way, mixing and superposition of the audios and videos of the third-party application may be implemented.

In Embodiment 2 the present invention, description is given by using a VoIP multimedia phone as an example, and the technical solution of the present invention provides a processing method for integrating local audios and videos and audio and video signals of the third-party application. As such, a call of the third-party application may join in the audio and video conference of the VoIP multimedia phone, which enriches the access function of the VoIP phone.

When the VoIP phone system enters conference processing of the third-party application according to the present invention, the VoIP phone may simultaneously receive audio and video data streams transmitted over different lines of the VoIP phone, audio and video data input and collected by the microphone and camera of the local VoIP phone, and audio and video data transmitted by the third-party application of the VoIP phone. The above audio/video data are mixed and superposed by using the sound mixing module, the screen mixing module of the VoIP phone system, such that the VoIP phone system is compatible with the third-party application to implement multi-party audio and video communications. In this embodiment, the Skype application is also used as an example the third-party application.

In a specific embodiment of the present invention, SIP-based audios and videos input over different lines of the VoIP phone may be decoded by using a phone decoder into signals that may be processed by a terminal phone, and audio and video data input by the Skype application may be processed by using a virtual sound card and a virtual graphic card. The virtual sound card is configured at the VoIP phone end to process the audio signals input by the third-party application, PCM data thereof is acquired by using the diver of the virtual sound card, and meanwhile audio data of the sound mixing module is collected by using the virtual sound card. During this process, the virtual sound card inputs and outputs PCM data, such that the VoIP phone end may directly carry out mixing by using the PCM data, and outputs the mixing data by using a periphery device.

Figure 3:
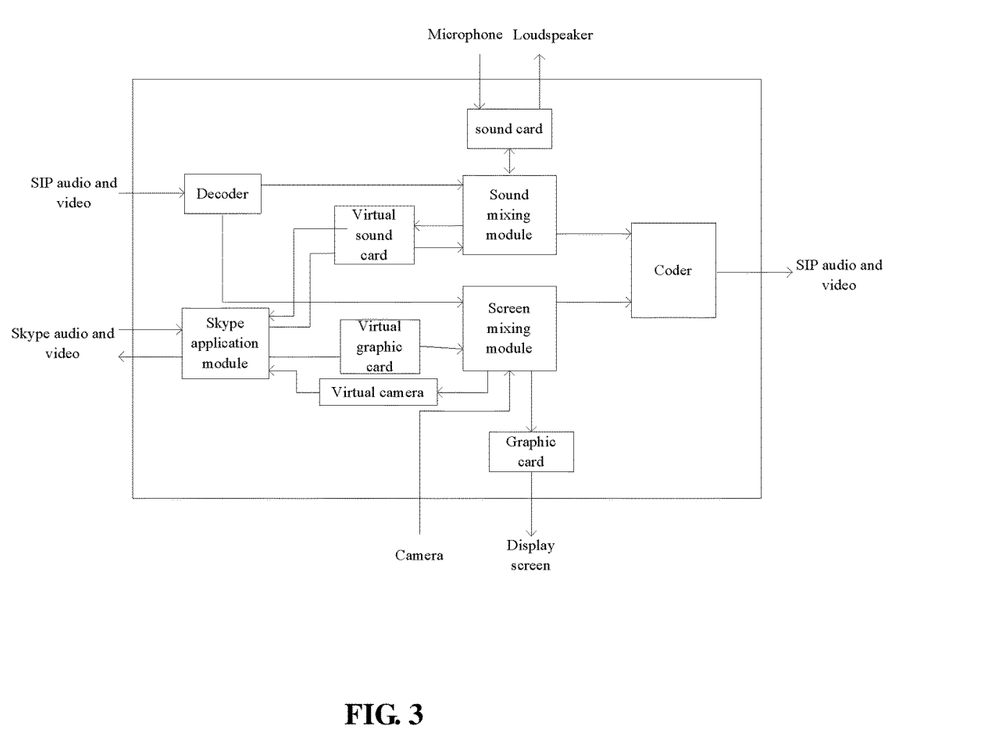
FIG. 3 is a diagram of functional modules according to Embodiment 2 of the present invention.

FIG. 3 is a diagram of functional modules according to Embodiment 2 of the present invention. In this specific embodiment, description is given based on SIM audio and video functions of the VoIP phone. With respect to the SIP line, decoding is implemented by a decoder supporting the SIP audio and video at the phone end, and audios and videos of the third-party application are decoded by the software of the third-party application. In addition, by using the virtual sound card, the virtual camera samples the audio and video data by the third-party application prior to decoding. Specifically, the audio is PCM data and the video is YUV data. As illustrated in FIG. 3, to implement conference processing of the third-party application according to the present invention, the VoIP phone end comprises the following functional modules: a decoder, a Skype application module, a virtual sound card, a virtual graphic card, a sound mixing module, a screen mixing module, a sound card, a graphic card, a virtual camera, a coder, and a teleconference control module (not illustrated in the drawings). The specific functions of the above functional modules are described as follows:

The decoder is configured to decode the SIP audio and video data streams transmitted over one or more session lines of the local phone, and is responsible for converting the input audio and video streams into signals that may be processed, for example, video signals of the YUV data and audio signals of the PCM data.

The Skype application module is configured to receive the audio and video streams that may not directly coded or decoded due to encryption, for example, the Skype data and the like. Data is acquired after the encrypted Skype audio and video data streams pass through the coding and decoding interface of an OS, for example, an OpenMax decoding. At the same time, the Skype application module may also receive the audio/video data from the virtual sound card/virtual camera, carry out relevant data and protocol processing subsequently, for example, coding, encryption and the like processing, and then transmit and communication the data to other communication terminals.

The virtual sound card is configured to acquire the decoded PCM data by using a device driver, and is also responsible for collecting second sound mixing data generated by the sound mixing module.

The virtual graphic card is a virtual device configured in the operating system, and is configured to provide a channel for acquiring decoded video data of the third-party application. Using a Linux operating system as an example, the virtual graphic card is established under the video architecture based on the Linux standard. The virtual graphic card provides an access interface/dev/display1 for the screen mixing module to read the relevant decoded video data subsequently.

The sound mixing module is configured to carry out sound mixing for the audio data input over the local session line and the audio signals of the PCM data of the third-party application of the virtual sound card to generate a first audio mixing data; and carry out sound mixing for the audio data input via the local microphone and the audio data input over the local session line to generate a second audio mixing data.

The screen mixing module is configured to carry out screen mixing for the video data input over the local session line and the video signals of the YUV data of the third-party application of the virtual graphic card to generate a first video mixing data; and carry out screen mixing for the video data collected by the local camera and the video data input over the local session line to generate a second video mixing data.

The sound card is configured to acquire first sound mixing data from the sound mixing module, subject the acquired data to sound card signal processing and then play the signals via a loudspeaker.

The graphic card is configured to carry out driver conversion and video image adaptation for the first screen mixing data experiencing the mixing and superposition, and then output the data via a display.

The virtual camera is configured to sample videos for second screen mixing data of the screen mixing module, and transmit video signals of the YUV data acquired via sampling to the Skype application module, such that the Skype application module carries out video coding and transmits the coded data to other terminal devices.

The coder is configured to decode the audio and video data upon sound mixing processing and video synthesis and superposition, and transmit the decoded data to other terminal devices.

The teleconference control module (not illustrated in the drawings) is configured to manage and control the audio and video data of the Skype application. when the VoIP phone is not in a teleconference state, the audio and video data of the Skype application is used as the audio and video of the third-party application in the call, for example, music playing and Skype call; when the VoIP phone is in a teleconference state, the Skype application is allowed to join in the current teleconference, and the audio and video of the Skype application are added to the teleconference for mixing and superposition as a path of data; and when the audio and video data of the Skype application is not added to the ongoing teleconference, the audio and video data of the third-party application is shielded.

The technical solution of the present invention is described in detail by using preferred Embodiment 3. In this specific embodiment, application of the virtual sound card involves three scenarios:

Scenario 1: Audio data output of an upper-layer application, for example, music playing and the like. This scenario involves single-oriented playing of the audio data, and the data of the virtual sound card is directly transmitted to the sound card for output.

Scenario 2: Call processing of the third-party application, for example, a Skype call, and input and output of the audio data of the upper-layer application. This scenario involves playing of the audio data, collection of the audio data, and an acoustic echo canceller (AEC) and the like processing. The audio data output by the virtual sound card is transmitted to the sound card for output upon relevant processing, and the data collected by the sound card is transmitted to the virtual sound card upon relevant processing. As such, the upper-layer application may acquire the input audio data.

Scenario 3: Conference processing of the third-party application. The call of the third-party application is added to the audio conference as a call. In this scenario, the data sent by the virtual sound card is transmitted to the sound card for output upon sound mixing and the like processing, and the data collected by the local sound card, the data transmitted over the SIP lines and the Skype audio data are transmitted to the virtual sound card upon sound mixing and the like processing.

An Android application layer acquires the call state of the third-party application and determines whether to add the call of the third-party application to the audio conference for sound mixing processing. The audio and video processing module receives the call state of the third-party application sent by the Android application layer and an instruction indicating whether to carry out sound mixing processing. As such, the audio and video processing module processes the services and data of the virtual sound card.

The technical solutions of the present invention are not limited to the above Android application, but may also be practiced in a Linux operating system, a Windows operating system, an iOS operating system and the like.

In addition, processing of the video data may also be referenced to different circumstances of processing of the audio data, which may be simply understood and practiced by a person skilled in the art, and is thus not described herein any further.

Figure 4:
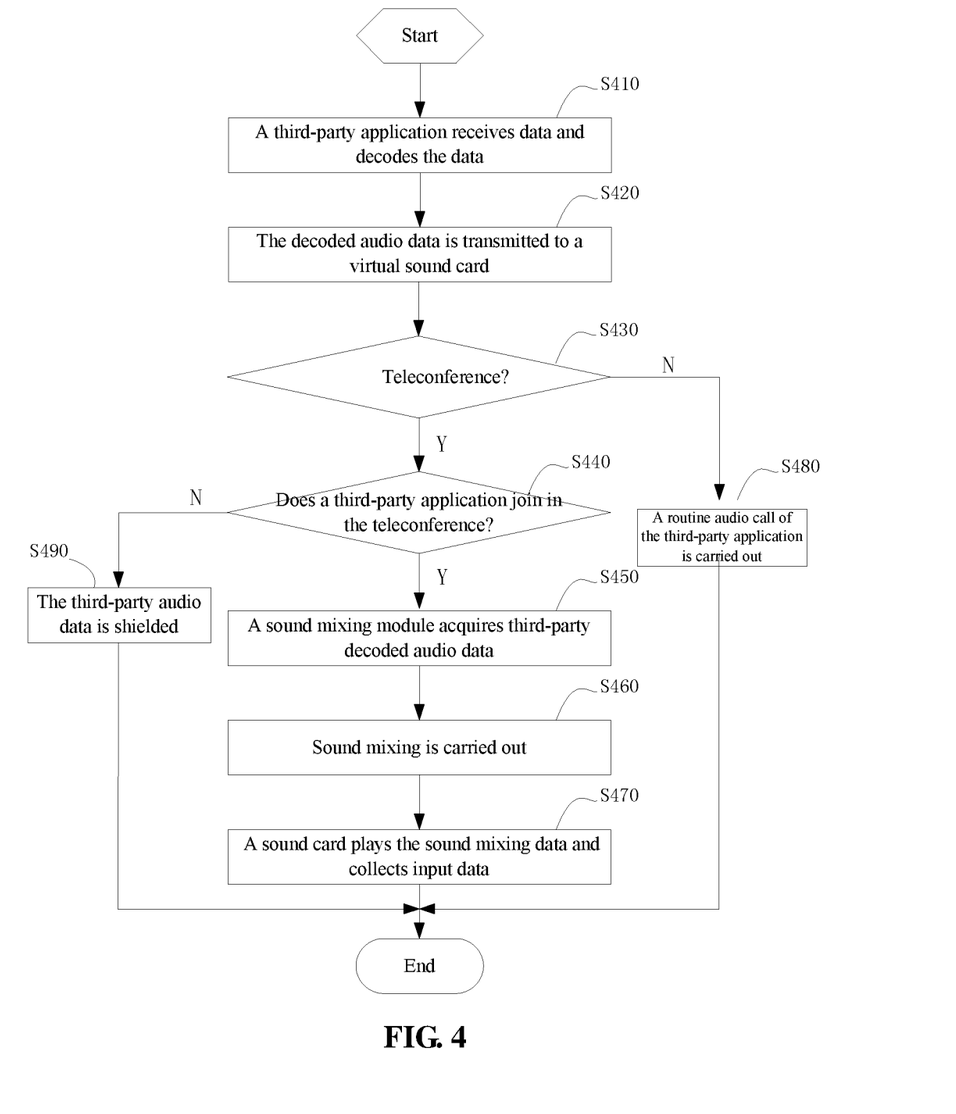
FIG. 4 is a flowchart of conference audio processing of a third-party application according to Embodiment 3 of the present invention.

FIG. 4 is a flowchart of conference audio processing of a third-party application according to Embodiment 3 of the present invention. As illustrated in FIG. 4, during the course of a conference to which the third-party application is introduced for call, in the aspect of audio processing, the VoIP phone includes the following steps:

Step S410: A third-party application module receives data and decodes the data, that is, the third-party application module, for example, the Skype, receives Skype-format data transmitted over network communication, and subjects the transmitted data to a coding and decoding interface of the operating system, for example, OpenMax, for decoding to acquire audio data.

Step S420: The decoded audio data is transmitted to a virtual sound card, that is, the virtual sound card is established under the audio architecture based on the Linux standard. The virtual sound card provides an access interface/dev/sound1, and subsequently the sound mixing module may acquire PCM data upon Skype audio decoding via this access interface.

Step S430: It is judged whether a VoIP phone is in a teleconference state, if the VoIP phone is in the teleconference state, step S440 is performed for further judgment, and otherwise, step S480 is performed.

Step S440: It is judged whether the Skype audio data is added to the teleconference, if the Skype audio data is added to the teleconference, step S450 is performed, and otherwise, step S490 is performed.

Step S450: Decoded audio data of the third-party application is acquired, and a sound mixing module acquires the PCM data upon Skype audio decoding. According to step S420, in this case, the sound mixing module acquires the PCM audio data via the access interface/dev/sound1 provided by the virtual sound card.

Step S460: Sound mixing is carried out for the PCM data upon Skype audio decoding and the PCM data generated upon decoding of the SIP audio inputs, to generate teleconference sound mixing data and transmit the data to the sound card. The SIP audios herein may be audio inputs over one or a plurality of sessions.

Step S470: The sound card plays the sound mixing data and collected input data. In this case, a local sound card plays the teleconference sound mixing data, and at the same time collects input data of a local microphone.

Step S480: A routine audio call of the third-party application is carried out. In this case, two scenarios are involved. Scenario 1: Output of audio data of an upper-layer application, for example, music playing and the like. This scenario involves only single-oriented playing of audio data, and data of the virtual sound card is directly transmitted to the sound card for output. Scenario 2: Call processing of the third-party application, for example, a Skype call, and input and output of the audio data of the upper-layer application. This scenario involves playing of the audio data, collection of the audio data, and an acoustic echo canceller (AEC) and the like processing. The audio data output by the virtual sound card is transmitted to the sound card for output upon relevant processing, and the data collected by the sound card is transmitted to the virtual sound card upon relevant processing. As such, the upper-layer application may acquire the input audio data.

Step S490: The audio data of the third-party application is shielded. If in this case, the Skype audio data is not added to the ongoing teleconference of the VoIP phone, playing of the Skype audio data may be directly shielded.

In the above specific embodiment, if the Skype audio of the third-party application is added to the current teleconference, to transmit the audio data of the teleconference by using the Skype software, the sound mixing module may also carry out sound mixing for the audio data of the local microphone collected by the sound card and the decoded PCM-format audio data input over the local session line and then transmit the decoded data to the virtual sound card. Finally, the data is subjected to Skype coding and encryption, and is transmitted and communicated to a terminal attending the teleconference corresponding to the Skype software.

Figure 5:
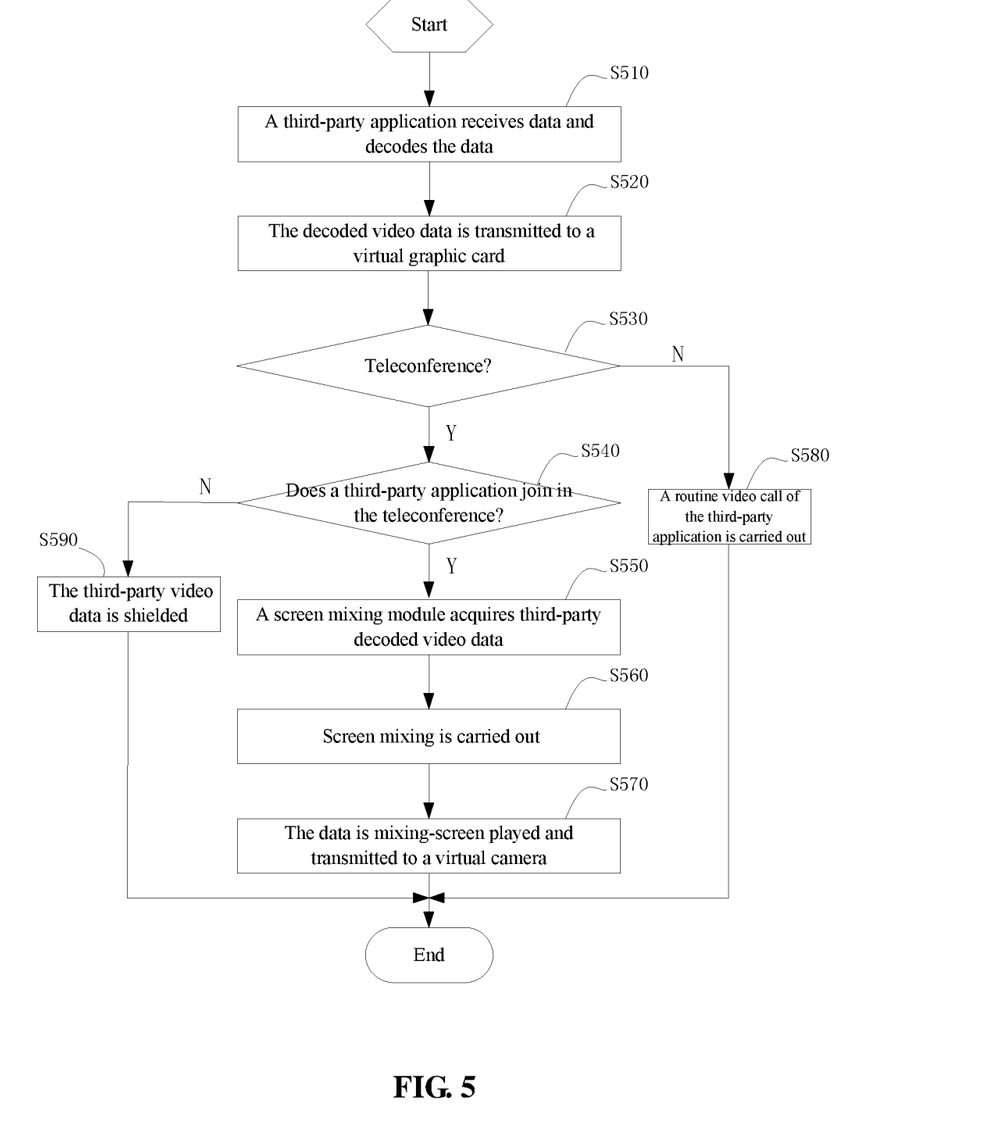
FIG. 5 is a flowchart of conference video processing of a third-party application according to Embodiment 3 of the present invention.

FIG. 5 is a flowchart of conference video processing of a third-party application according to Embodiment 3 of the present invention. As illustrated in FIG. 4, during the course of a conference to which the third-party application is introduced for call, in the aspect of video processing, the VoIP phone includes the following steps:

Step S510: A third-party application module receives data and decodes the data, that is, the third-party application module, for example, the Skype, receives Skype-format data transmitted over network communication, and subjects the transmitted data to a coding and decoding interface of the operating system, for example, OpenMax, for decoding to acquire video data.

Step S520: The decoded video data is transmitted to a virtual graphic card. For example, in a Linux operating system, the virtual graphic card is established under the audio architecture based on the Linux standard. The virtual graphic card provides an access interface/dev/display1, and subsequently the screen mixing module may acquire YUV data upon Skype video decoding via this access interface.

Step S530: It is judged whether a VoIP phone is in a teleconference state, if the VoIP phone is in the teleconference state, step S440 is performed for further judgment, and otherwise, step S480 is performed.

Step S540: It is judged whether the Skype video data is added to the teleconference, if the Skype audio data is added to the teleconference, step S450 is performed, and otherwise, step S490 is performed.

Step S550: Decoded video data of the third-party application is acquired, and the screen mixing module acquires the YUV data upon Skype video decoding.

Step S560: Screen mixing is carried out for the Skype video data of the virtual graphic card and the SIP video data input over the local session line to generate first screen mixing data; and screen mixing and superposition is carried out for the video data collected by a local camera and the SIP video data input over the local SIP session line to generate second screen mixing data.

Step S570: The first screen mixing data is subjected to driver conversion and video image adaptation via the graphic card, and is then displayed in a screen-mixing manner; the second screen mixing data is subjected to screen mixing video collection via a virtual camera and then transmitted to the Skype application module, and the third-party application carries out relevant data protocol processing such as coding and encryption and then transmitted and communicated to other terminal devices.

Step S580: A routine video call of the third-party application is carried out. In this case, two scenarios are involved. Scenario 1: Output of video data of an upper-layer application. This scenario involves only single-oriented playing of video data, and data of the virtual graphic card is directly transmitted to the graphic card for output. Scenario 2: Call processing of the third-party application, for example, a Skype call, and input and output of the video data of the upper-layer application. This scenario involves playing of the video data and collection of the video data. The video data output by the virtual graphic card is transmitted to the graphic card for output upon relevant processing, and the data collected by the graphic card is transmitted to the virtual camera upon relevant processing. As such, the upper-layer application may acquire the input video data.

Step S590: The video data of the third-party application is shielded. If in this case, the Skype video data is not added to the ongoing teleconference of the VoIP phone, playing of the Skype video data may be directly shielded.

According to the present invention, the third-party application completes collection of videos by using the virtual camera. According to the actual needs, the data of a physical camera may be collected, or the screen mixing video data may be collected. Display of the videos may be practiced via the graphic card, or the graphic card may transmit the videos to the screen mixing module for relevant processing. The above described specific solutions and combinations thereof are considered as deduced applications of the technical solutions of the present invention.

The above described embodiments are merely preferred embodiments of the present invention, but are not intended to limit the present invention. Any modification, equivalent replacement, and improvement made without departing from the spirit and principle of the present invention shall fall within the protection scope of the present invention.

What is claimed is:

1. A method of a voice over internet protocol (VoIP) phone of processing conference of a third-party application, wherein the VoIP phone comprises a third-party application module, a virtual sound card, a virtual graphic card, an audio mixing module, a video mixing module, a sound card, a graphic card, a decoder and a coder, wherein the method comprises:

receiving, by the third-party application module, at least one of audio data with a audio format adapted to third-party application and video data with a video format adapted to third-party application from the third-party application;

receiving, by the virtual sound card, the audio data with the audio format adapted to third-party application from the third-party application module if the third-party application module receives the audio data with the audio format adapted to third-party application, re-adapting the audio data with the audio format adapted to third-party application into a first audio data with a audio format adapted to the VoIP phone, and transmitting the first audio data with the audio format adapted to the VoIP phone to the audio mixing module, wherein the audio format adapted to third-party application is different from the audio format adapted to the VoIP phone, and the audio format adapted to third-party application can not be adapted to the VoIP phone;

receiving, by the virtual graphic card, the video data with the video format adapted to third-party application from the third-party application module if the third-party application module receives the video data with the video format adapted to third-party application, re-adapting the video data with the video format adapted to third-party application into a first video data with a video format adapted to the VoIP phone, and transmitting the first video data with the video format adapted to the VoIP phone to the video mixing module, wherein the video format adapted to third-party application is different from the video format adapted to the VoIP phone, and the video format adapted to third-party application can not be adapted to the VoIP phone;

decoding, by the decoder, at least one of a second audio data with the audio format adapted to the VoIP phone and a second video data with the video format adapted to the VoIP phone from at least one local session line into a decoded audio data with the audio format adapted to the VoIP phone and a decoded video data with the video format adapted to the VoIP phone respectively, and transmitting the decoded audio data and the decoded video data to the audio mixing module and the video mixing module respectively;

mixing, by the audio mixing module, the first audio data with the audio format adapted to the VoIP phone from the virtual sound card and the decoded audio data with the audio format adapted to the VoIP phone from the decoder to generate a first mixed audio data with the audio format adapted to the VoIP phone, and transmitting the first mixed audio data with the audio format adapted to the VoIP phone to at least one of the coder for coding or the sound card for playing;

mixing, by the video mixing module, the first video data with the video format adapted to the VoIP phone from the virtual graphic card and the decoded video data with the video format adapted to the VoIP phone from the decoder to generate a first mixed video data with the video format adapted to the VoIP phone, and transmitting the first mixed video data with the video format adapted to the VoIP phone to at least one of the coder for coding or the graphic card for playing; and coding, by the coder, the first mixed audio data with the audio format adapted to the VoIP phone and the first mixed video data with the video format adapted to the VoIP phone to generate a coded audio data and a coded video data respectively; and transmitting the coded audio data and the coded video data to other terminal devices respectively.

2. The method according to claim 1, wherein the method further comprises:

transmitting without mixing, by the audio mixing module, the first audio data with the audio format adapted to the VoIP phone from the virtual sound card to at least one of the coder or the sound card if the decoder does not receive the second audio data with the audio format adapted to the VoIP phone from the at least one local session line.

3. The method according to claim 1, wherein the method further comprises:

transmitting without mixing, by the video mixing module, the first video data with the video format adapted to the VoIP phone from the virtual graphic card to at least one of the coder or the graphic card if the decoder does not receive the second video data with the video format adapted to the VoIP phone from the at least one local session line.

4. The method according to claim 1, wherein the method further comprises:

receiving, by the sound card, a third audio data with the audio format adapted to the VoIP phone from a local microphone and transmitting it to the audio mixing module;

mixing, by the audio mixing module, the third audio data with the audio format adapted to the VoIP phone from the sound card and the decoded audio data with the audio format adapted to the VoIP phone from the decoder to generate a second mixed audio data with the audio format adapted to the VoIP phone;

transmitting, by the audio mixing module, the second mixed audio data with the audio format adapted to the VoIP phone to the virtual sound card;

re-adapting, by the virtual sound card, the second mixed audio data with the audio format adapted to the VoIP phone into a fourth audio data with the audio format adapted to third-party application;

transmitting, by the virtual sound card, the fourth audio data with the audio format adapted to third-party application to the third-party application module; and transmitting, by the third-party application module, the fourth audio data with the audio format adapted to third-party application to the third-party application.

5. The method according to claim 1, wherein the method further comprises:

mixing, by the video mixing module, a third video data with the video format adapted to the VoIP phone from a local camera and the decoded video data with the video format adapted to the VoIP phone to generate a second mixed video data with the video format adapted to the VoIP phone;

transmitting, by the video mixing module, the second mixed video data with the video format adapted to the VoIP phone to a virtual camera;

re-adapting, by the virtual camera, the second mixed video data with the video format adapted to the VoIP phone into a fourth video data with the video format adapted to third-party application;

transmitting, by the virtual camera, the fourth video data with the video format adapted to third-party application to the third-party application module; and transmitting, by the third-party application module, the fourth video data with the video format adapted to third-party application to the third-party application.

6. The method according to claim 1, wherein the third-party application is a Skype application.

7. A voice over internet protocol (VoIP) phone of processing conference of a third-party application, wherein the VoIP phone comprises a third-party application module, a virtual sound card, a virtual graphic card, an audio mixing module, a video mixing module, a sound card, a graphic card, a decoder and a coder, wherein the third-party application module is configured to receive at least one of audio data with a audio format adapted to third-party application and video data with a video format adapted to third-party application from the third-party application;

the virtual sound card is configured to receive the audio data with the audio format adapted to third-party application from the third-party application module if the third-party application module receives the audio data with the audio format adapted to third-party application, re-adapt the audio data with the audio format adapted to third-party application into a first audio data with a audio format adapted to the VoIP phone, and transmit the first audio data with the audio format adapted to the VoIP phone to the audio mixing module, wherein the audio format adapted to third-party application is different from the audio format adapted to the VoIP phone, and the audio format adapted to third-party application can not be adapted to the VoIP phone;

the virtual graphic card is configured to receive the video data with the video format adapted to third-party application from the third-party application module if the third-party application module receives the video data with the video format adapted to third-party application, re-adapt the video data with the video format adapted to third-party application into a first video data with a video format adapted to the VoIP phone, and transmit the first video data with the video format adapted to the VoIP phone to the video mixing module, wherein the video format adapted to third-party application is different from the video format adapted to the VoIP phone, and the video format adapted to third-party application can not be adapted to the VoIP phone;

the decoder is configured to decode at least one of a second audio data with the audio format adapted to the VoIP phone and a second video data with the video format adapted to the VoIP phone from at least one local session line into a decoded audio data with the audio format adapted to the VoIP phone and a decoded video data with the video format adapted to the VoIP phone respectively, and transmit the decoded audio data and the decoded video data to the audio mixing module and the video mixing module respectively;

the audio mixing module is configured to mix the first audio data with the audio format adapted to the VoIP phone from the virtual sound card and the decoded audio data with the audio format adapted to the VoIP phone from the decoder to generate a first mixed audio data with the audio format adapted to the VoIP phone, and transmit the first mixed audio data with the audio format adapted to the VoIP phone to the coder for coding or the sound card for playing;

the video mixing module is configured to mix the first video data with the video format adapted to the VoIP phone from the virtual graphic card and the decoded video data with the video format adapted to the VoIP phone from the decoder to generate a first mixed video data with the video format adapted to the VoIP phone, and transmit the first mixed video data with the video format adapted to the VoIP phone to the coder for coding or the graphic card for playing; and the coder is configured to code the first mixed audio data with the audio format adapted to the VoIP phone and the first mixed video data with the video format adapted to the VoIP phone to generate a coded audio data and a coded video data respectively; and transmit the coded audio data and the coded video data to other terminal devices respectively.

8. The VoIP phone according to claim 7, wherein the audio mixing module is further configured to transmit without mix the first audio data with the audio format adapted to the VoIP phone from the virtual sound card to at least one of the coder or the sound card if the decoder does not receive the second audio data with the audio format adapted to the VoIP phone from the at least one local session line.

9. The VoIP phone according to claim 7, wherein the video mixing module is further configured to transmit without mix the first video data with the video format adapted to the VoIP phone from the virtual graphic card to at least one of the coder or the graphic card if the decoder does not receive the second video data with the video format adapted to the VoIP phone from at least one local session line.

10. The VoIP phone according to claim 7, wherein,
the sound card is further configured to receive a third audio data with the audio format adapted to the VoIP phone from a local microphone and transmit it to the audio mixing module;

the audio mixing module is further configured to mix the third audio data with the audio format adapted to the VoIP phone from the sound card and the decoded audio data with the audio format adapted to the VoIP phone from the decoder to generate a second mixed audio data with the audio format adapted to the VoIP phone and transmit the second mixed audio data with the audio format adapted to the VoIP phone to the virtual sound card;

the virtual sound card is further configured to re-adapt the second mixed audio data with the audio format adapted to the VoIP phone into a fourth audio data with the audio format adapted to third-party application and transmit the fourth audio data with the audio format adapted to third-party application to the third-party application module; and the third-party application module is further configured to transmit the fourth audio data with the audio format adapted to third-party application to the third-party application.

11. The VoIP phone according to claim 7, wherein,
the video mixing module is further configured to mix a third video data with the video format adapted to the VoIP phone from a local camera and the decoded video data with the video format adapted to the VoIP phone to generate a second mixed video data with the video format adapted to the VoIP phone and transmit the second mixed video data with the video format adapted to the VoIP phone to the virtual graphic card;

the virtual graphic card is further configured to re-adapt the second mixed video data with the video format adapted to the VoIP phone into a fourth video data with the video format adapted to third-party application and transmit the fourth video data with the video format adapted to third-party application to the third-party application module; and the third-party application module is further configured to transmit the fourth video data with the video format adapted to third-party application to the third-party application.

12. The VoIP phone according to claim 7, wherein the third-party application is a Skype application.

* * * * *